United States Patent
Choi

(10) Patent No.: US 10,137,881 B2
(45) Date of Patent: Nov. 27, 2018

(54) SYSTEM AND METHOD FOR HYBRID VEHICLE REGENERATIVE BRAKING CONTROL

(71) Applicant: HYUNDAI MOTOR COMPANY, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 63 days.

(21) Appl. No.: 15/374,717

(22) Filed: Dec. 9, 2016

(65) Prior Publication Data
US 2018/0072305 A1    Mar. 15, 2018

(30) Foreign Application Priority Data
Sep. 12, 2016 (KR) .................... 10-2016-0117344

(51) Int. Cl.
| | |
|---|---|
| *B60W 20/14* | (2016.01) |
| *B60L 7/18* | (2006.01) |
| *B60W 30/18* | (2012.01) |

(52) U.S. Cl.
CPC ............ *B60W 20/14* (2016.01); *B60L 7/18* (2013.01); *B60W 30/18127* (2013.01); *B60L 2240/12* (2013.01); *B60W 2710/18* (2013.01)

(58) Field of Classification Search
None
See application file for complete search history.

(56) References Cited

U.S. PATENT DOCUMENTS

| | | | | |
|---|---|---|---|---|
| 9,709,167 | B2 | 7/2017 | Kim et al. | |
| 2006/0064225 | A1* | 3/2006 | Tabata | B60K 6/48 701/96 |
| 2006/0289210 | A1* | 12/2006 | Yoshimi | B60K 6/26 180/65.245 |
| 2012/0234133 | A1* | 9/2012 | Ikegami | B60K 6/48 74/661 |

(Continued)

FOREIGN PATENT DOCUMENTS

| | | |
|---|---|---|
| JP | 10-73161 A | 3/1998 |
| KR | 10-0819978 B1 | 4/2008 |
| KR | 10-2009-0123182 A | 12/2009 |

(Continued)

*Primary Examiner* — Rami Khatib
(74) *Attorney, Agent, or Firm* — McDermott Will & Emery LLP

(57) ABSTRACT

A system for controlling regenerative braking in a hybrid vehicle, includes: a driving information sensor detecting driving information; a motor assisting a driving force of an engine in an acceleration interval of the hybrid vehicle; a motor controller charging a battery using a regenerative energy generated by the motor; a hybrid controller calculating a first braking force generated by friction in the engine according to a first gear stage of the hybrid vehicle, setting a second braking force due to friction in the engine used to compensate for a limited regenerative braking force using a kick-down shifting at a second gear stage as a target regenerative braking force, and controlling the kick-down shifting using a third gear stage that compensates for the limited regenerative braking force and corresponds to the braking force due to friction in the engine; and a transmission controller performing the kick-down shifting.

10 Claims, 3 Drawing Sheets

(56) References Cited

U.S. PATENT DOCUMENTS

2013/0296100 A1* 11/2013 Nefcy .................. B60W 10/08
477/4
2014/0297082 A1* 10/2014 Im ............................ B60L 7/10
701/22

FOREIGN PATENT DOCUMENTS

| KR | 10-1048149 B1 | 7/2011 |
| KR | 10-1113578 B1 | 2/2012 |
| KR | 10-1592771 B1 | 2/2016 |
| KR | 10-2016-0045364 A | 4/2016 |

* cited by examiner

SYSTEM AND METHOD FOR HYBRID VEHICLE REGENERATIVE BRAKING CONTROL

CROSS-REFERENCE TO RELATED APPLICATION

This application claims the benefit of priority to Korean Patent Application No. 10-2016-0117344 filed in the Korean Intellectual Property Office on Sep. 12, 2016, the entire content of which is incorporated herein by reference.

TECHNICAL FIELD

The present disclosure relates to a system and a method for hybrid vehicle regenerative braking control, and more particularly, to a system and a method for controlling regenerative braking in a mild hybrid vehicle in which a motor only assists an engine.

BACKGROUND

Generally, a hybrid vehicle such as a hybrid electric vehicle (HEV) or a plug-in hybrid electric vehicle (PHEV) includes an engine and a motor operated by a high voltage battery to assist an output torque of the engine. The engine and the motor are a power source.

According to a driving situation, the hybrid vehicle is classified into a full (hard) type hybrid vehicle capable of driving the engine or the motor and a mild (soft) type hybrid vehicle in which the motor only assists an engine.

The mild hybrid vehicle is driven on the basis of the engine power, and the motor assists the engine power but does not operate alone.

In order to support both electric vehicle (EV) driving and hybrid electric vehicle (HEV) driving, the full type hybrid vehicle had a problem of increase in production cost that is due to large changes in internal structure of the vehicle and increase of parts of the vehicle.

However, unlike the full type hybrid vehicle, the mild hybrid vehicle does not significantly change internal structure of the vehicle in order to support the electric vehicle driving and the hybrid electric vehicle driving, and it is technically easy to implement the electric vehicle driving and the hybrid electric vehicle driving in the mild hybrid vehicle. Thus, production cost can be reduced.

The mild hybrid vehicle can improve fuel economy by 15% compared to a conventional vehicle, and 2% of the improvement of the fuel economy is obtained by regenerative braking energy generated when a brake pedal is stepped on.

According to regenerative braking regulations, a regenerative braking system should compensate for a limited regenerative braking force by a braking force when the regenerative braking force is limited.

The full type hybrid vehicle compensates for the limited regenerative braking force as much as the braking force by increasing brake hydraulic pressure in a hydraulic pressure regenerative braking system by the limited regenerative braking force.

However, when the hydraulic regenerative braking system is additionally applied to the mild hybrid vehicle, there is a problem of cost increase. If a regenerative braking function is abandoned without applying the hydraulic regenerative braking system, there is a problem that reduces fuel efficiency improvement effect of 2%.

Accordingly, there is a need to reduce manufacturing cost by omitting the hydraulic regenerative braking system, and there is a need to improve fuel economy using the regenerative braking function by satisfying the regenerative braking regulations.

The above information disclosed in this section is merely for enhancement of understanding of the background of the invention, and therefore, it may contain information that does not form the prior art that is already known in this country to a person of ordinary skill in the art.

RELATED ART DOCUMENT

Patent Document (Patent reference 1) Korean Patent Registration No. 10-0819978 (Apr. 7, 2016)

SUMMARY

The present disclosure has been made in an effort to provide a system and a method for controlling regenerative braking in a hybrid vehicle that are capable of reducing cost due to omission of an additional hydraulic regenerative braking system and of satisfying regenerative braking regulations by compensating for a braking force using kick-down gear shifting when a regenerative braking force of the hybrid vehicle is limited.

According to an exemplary embodiment of the present disclosure, a system for controlling regenerative braking in the hybrid vehicle includes: a driving information sensor detecting driving information according to driving of the hybrid vehicle; a motor assisting a driving force of an engine in an acceleration interval of the hybrid vehicle and operating as a generator in a deceleration interval in which a brake operates; a motor controller charging a battery using a regenerative energy generated by the motor; a hybrid controller calculating a braking force generated by the engine friction according to a first gear stage of the hybrid vehicle, setting the braking force that is used to compensate for a limited regenerative braking force using a kick-down shifting at the gear stage when the brake operates during driving of the hybrid vehicle as a target regenerative braking force to control regenerative braking, and controlling the kick-down shifting using a the gear stage that compensates for the limited regenerative braking force and corresponds to the braking force; and a transmission controller configured to perform the kick-down shifting based on control of the hybrid controller.

The hybrid controller may control the kick-down shifting using the highest gear stage among gear stages capable of generating the braking force due to friction in the engine greater than the limited regenerative braking force.

The hybrid controller may compare a braking force in a gear stage used when a driver of the hybrid vehicle depresses a brake pedal during driving of the hybrid vehicle and the largest value among values corresponding to the braking force generated by friction in the engine according to the drivable gear stage, and may set a smaller value among the compared values as the target regenerative braking force.

The hybrid controller may determine whether a regenerative braking force is generated when the regenerative braking is controlled to determine that the regenerative braking force is limited when the regenerative braking force is not generated or the regenerative braking force is less than the target regenerative braking force.

The hybrid controller may calculate the limited regenerative braking force as a difference between the target regenerative braking force and a regenerative braking force currently generated.

The hybrid vehicle may be a mild hybrid vehicle or a full type hybrid vehicle.

According to another exemplary embodiment of the present disclosure, a method for controlling regenerative braking to compensate for a limited regenerative braking force when regenerative braking of a mild hybrid vehicle is limited includes: a) calculating a braking force generated by an engine friction according to a drivable gear stage of the mild hybrid vehicle; b) setting the braking force that is used to compensate for the limited regenerative braking force using a kick-down shifting at the gear stage when a brake operates during driving of the mild hybrid vehicle as a target regenerative braking force; c) controlling regenerative braking using the target regenerative braking force when a regenerative braking condition is satisfied in a state in which the brake operates during driving of the mild vehicle; and d) controlling the kick-down shifting using the gear stage that compensates for the limited regenerative braking force and corresponds to the braking force.

Step d) may include controlling the kick-down shifting using the highest gear stage among gear stages capable of generating the braking force due to friction in the engine greater than the limited regenerative braking force.

Step b) may include: comparing the braking force in the gear stage used when the brake operates and the largest value among values corresponding to the braking force generated by friction in the engine according to the drivable gear stage; and setting a smaller value among the compared values as the target regenerative braking force.

Step c) may include determining that the regenerative braking condition is satisfied when the a state of charge (SOC) of a battery, temperature of the battery, temperature of a motor, and temperature of an inverter are in a state for performing the regenerative braking in a state in which the brake operates during driving of the mild hybrid vehicle.

Step d) may include calculating the limited regenerative braking force as a difference between the target regenerative braking force and a regenerative braking force currently generated.

Step d) may include displaying diagnosis information on limitation of the regenerative braking force by diagnosing why a regenerative braking force is not generated or reduced when the regenerative braking force is not generated or reduced according to a state of at least one of a battery, a motor, and an inverter.

According to the exemplary embodiments of the present disclosure, it is possible to satisfy the regenerative braking regulations without the additional hydraulic regenerative braking system by compensating for the braking force using kick-down shifting when a regenerative braking force of a mild hybrid vehicle is limited. Thus, fuel efficiency of 2% may be improved.

In addition, customer satisfaction of the mild hybrid vehicle can be increased and production cost of the vehicle can be reduced by maintaining a regenerative braking function while omitting the hydraulic regenerative braking system.

DETAILED DESCRIPTION OF THE EMBODIMENTS

Figure 1:
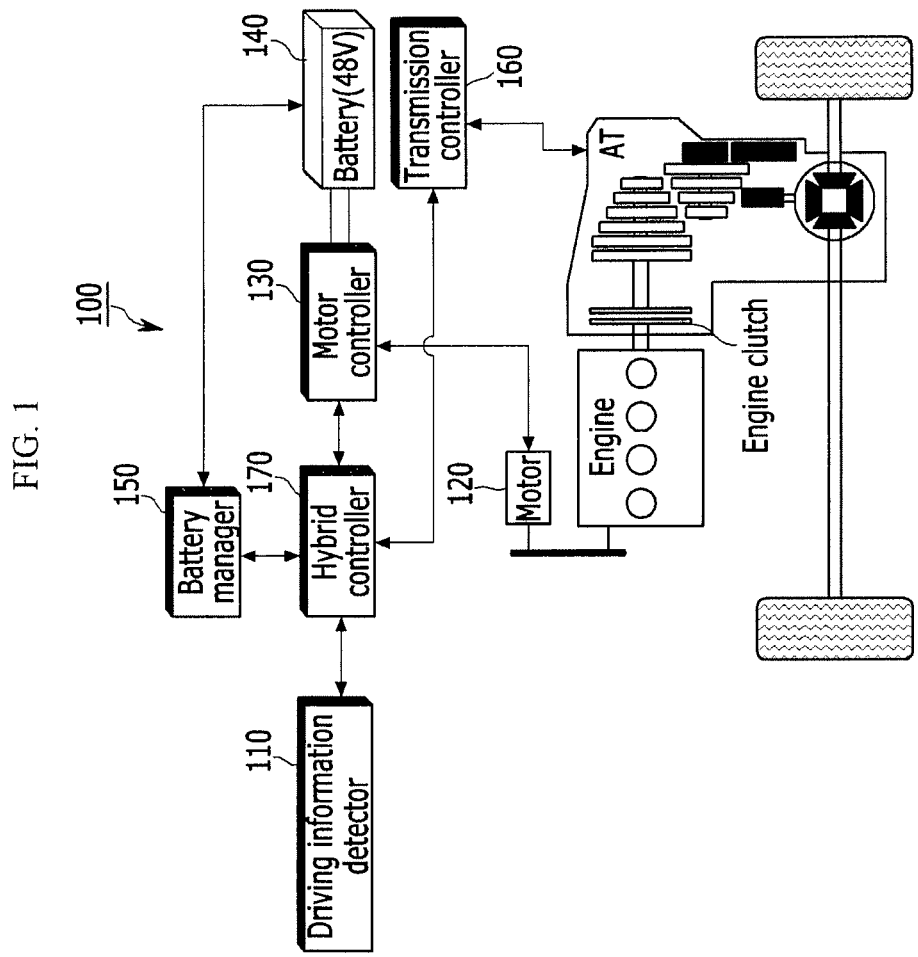
FIG. 1 is a view schematically showing a system for controlling regenerative braking in a mild hybrid vehicle according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", and "module" described in the specification mean units for processing at least one function and operation and can be implemented by hardware components or software components and combinations thereof.

Throughout the specification, some methods may be executed by at least one controller. The term "controller" refers to a hardware device including a memory and a processor configured to execute one or more steps that should be interpreted as its algorithmic structure. The processor interacts with memory that is configured to store algorithmic steps and the processor is specifically configured to execute said algorithmic steps to perform one or more processes which are described further below.

Hereinafter, a system and a method for controlling regenerative braking in a hybrid vehicle according to an exemplary embodiment of the present disclosure will be described in detail with reference to the accompanying drawings.

FIG. 1 is a view schematically showing a system for controlling regenerative braking in a mild hybrid vehicle according to an exemplary embodiment of the present disclosure.

Referring to FIG. 1, a system 100 for controlling regenerative braking includes a driving information sensor 110, a motor 120, a motor controller (or a motor control unit, MCU) 130, a battery 140, a battery manager 150, a transmission controller (or a transmission control unit, TCU) 160, and a hybrid controller (or a hybrid control unit, HCU) 170.

The driving information sensor 110 may detect driving information such as the vehicle speed, a gear shift stage, a displacement of an accelerator pedal (or a value of an accelerator position sensor (APS)), or a displacement of a brake pedal (or a value of a brake position sensor (BPS)) according to driving of the hybrid vehicle, and the driving information sensor may provide the detected driving information to the hybrid controller 170.

The motor 120 may be also called a hybrid starter generator (HSG) and may operate as a starter and a generator of the mild hybrid vehicle using a 48V high voltage motor with small size.

Figure 2:
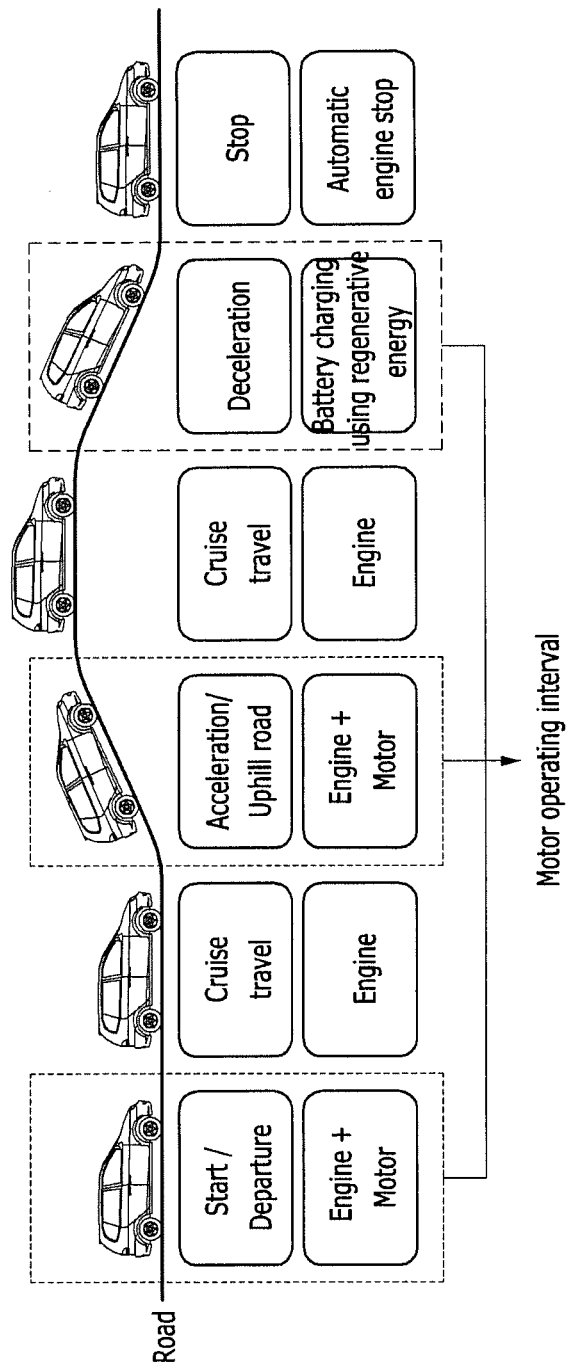
FIG. 2 is a view showing the motor operation period of the mild hybrid vehicle according to an exemplary embodiment of the present disclosure.

FIG. 2 is a view showing a motor operation period of a mild hybrid vehicle according to an exemplary embodiment of the present disclosure.

Referring to FIG. 2, the motor 120 may start an engine shown in FIG. 1 according to an applied control signal, and may assist the engine driving force (or the engine driving torque) in a low speed interval in which the vehicle departs, in an acceleration condition, or in an uphill road condition.

In addition, when a regenerative braking condition is satisfied in a deceleration interval in which a brake operates, the motor 120 may operate as a generator to charge the battery 140 with the generated regenerative energy.

The motor controller 30 may convert a direct current (DC) voltage supplied from the battery 140 into a three-phase alternating current (AC) voltage to drive the motor 120 based on an applied control signal, and may use the regenerative energy generated by the motor 120 to charge the battery 140.

The battery 140 may supply power to the motor 120 during starting of the engine and when the motor assists the engine, and may store the regenerative energy collected by the motor 120 during regenerative braking control.

The battery 140 may include a plurality of unit cells. A high voltage for providing a voltage (e.g., 48V DC) to the motor 120 may be stored in the battery 140.

The battery manager 150 may detect a current, a voltage, and a temperature of each cell of the battery 140 to manage a state of charge (SOC) of the battery. The battery manager 150 may control a charge/discharge voltage of the battery 140 to prevent the battery from being over-discharged to a voltage less than a lower limit voltage and from being overcharged to a voltage greater than an upper limit voltage, thereby shortening life of the battery.

The transmission controller 160 may control an overall operation of a transmission such as an automatic transmission (AT) of FIG. 1. For example, the transmission controller 160 may control shift ratio of the transmission according to an output torque of the vehicle and may perform kick-down shifting based on control of the hybrid controller 170 when a regenerative braking force (or a regenerative braking torque) is limited.

The hybrid controller 170 may integrally control an overall operation of each of the controllers and elements of the vehicle using a network according to driving request of a driver of the vehicle and the vehicle state.

The hybrid controller 170 may calculate a regenerative braking execution amount to control regenerative braking of the motor 120 based on a braking demand detected by the driving information sensor 110.

The hybrid controller 170 may calculate a braking force generated by the engine friction according to a drivable gear stage.

The hybrid controller 170 may set a braking force due to the engine friction used to compensate for the limited regenerative braking force using a kick-down shifting (or a kick-down shift) at a gear stage used when the brake operates during driving of the vehicle as a target regenerative braking force so that the hybrid controller controls regenerative braking.

When the regenerative braking force during the regenerative braking is limited to the target regenerative braking force, the hybrid controller 170 may perform the kick-down shifting using a gear stage corresponding to the engine friction braking force. The gear stage may compensate for the limited regenerative braking force.

At this time, the hybrid controller 170 may perform the kick-down shifting as the highest gear stage among gear stages capable of generating the engine friction braking force greater than the limited regenerative braking force.

For example, it is assumed that the engine friction braking force according to the drivable gear stage of the mild hybrid vehicle is −30 Nm when a fourth stage shifts to a third stage, −60 Nm when the fourth stage shifts to a second stage, and −100 Nm when the fourth stage shifts to a first stage.

If a regenerative braking force actually generated is detected as −50 Nm when the target regenerative braking force of the motor 120 is −100 Nm by regenerative braking at the fourth stage (or the fourth gear stage) during driving of the vehicle, the limited regenerative braking force that is a difference between the target regenerative braking force and the regenerative braking force actually generated may be calculated as −50 Nm.

At this time, the hybrid controller 170 may perform the kick-down shifting from a current gear stage that is the fourth stage to the second stage that is the highest gear stage among the second stage and the first stage which are capable of generating a braking force greater than the calculated −50 Nm.

Therefore, a deceleration difference due to limitation of the regenerative braking force may be minimized by compensating for the limited regenerative braking force using the engine friction braking force of −60 Nm which is greater than the calculated −50 Nm and is an approximate value closest to the calculated −50 Nm.

A method for controlling regenerative braking in the mild hybrid vehicle will be described based on a configuration included in the system 100 for controlling regenerative braking. Functions of the hybrid controller 170 will be described in further detail in a description of the method.

Functions of the controllers included in the system 100 for controlling regenerative braking may be integrated regardless of their names. A subject that performs the functions may be the system 100 for controlling regenerative braking.

Therefore, in the description of the method, a subject performing each step may be the system 100 for controlling regenerative braking.

Figure 3:
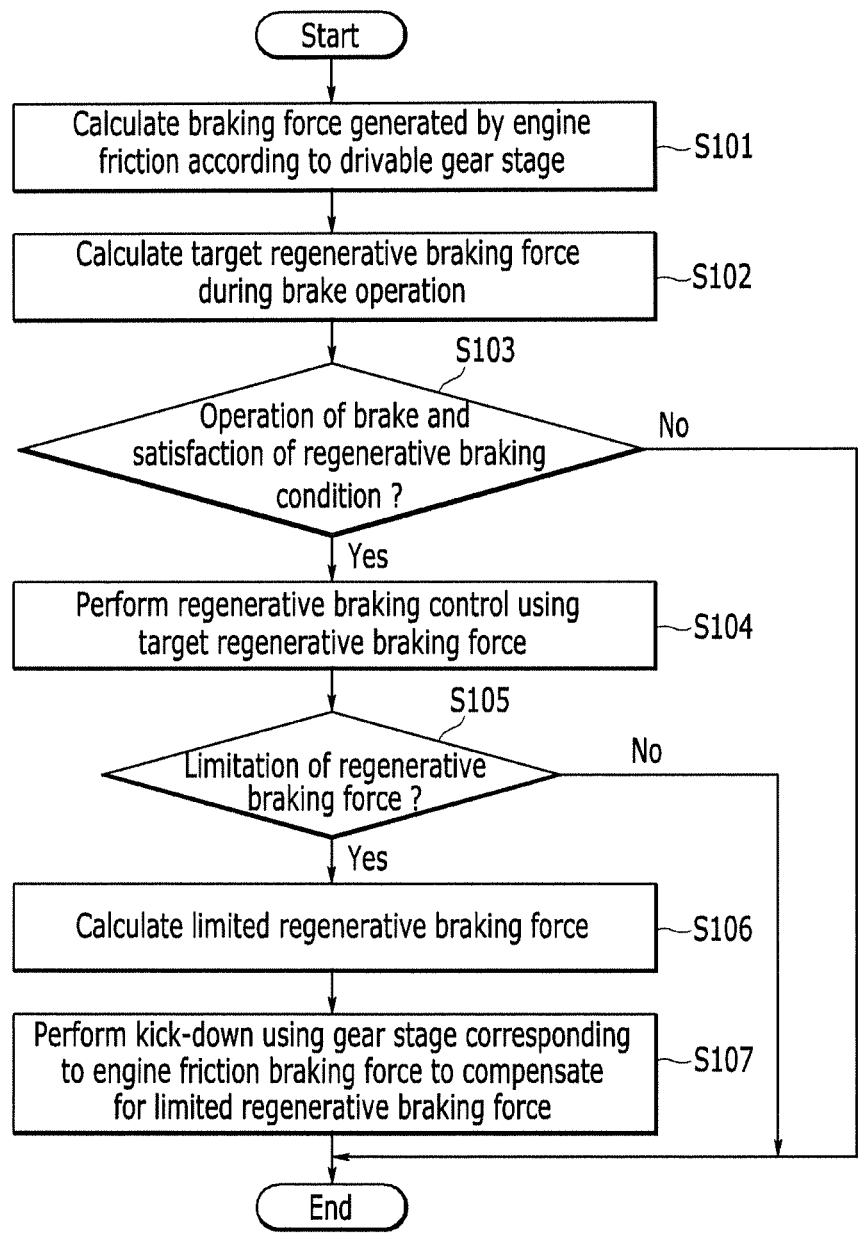
FIG. 3 is a flowchart schematically illustrating the method for controlling regenerative braking in the mild hybrid vehicle according to an exemplary embodiment of the present disclosure.

FIG. 3 is a flowchart schematically illustrating a method for controlling regenerative braking in a mild hybrid vehicle according to an exemplary embodiment of the present disclosure.

Referring to FIG. 3, the system 100 for controlling regenerative braking may calculate a braking force generated by the engine friction according to the drivable gear stage of the mild hybrid vehicle (step S101).

The braking force generated by the engine friction according to the drivable gear stage may be calculated in order to compensate for the limited regenerative braking force using the engine friction braking force when the regenerative braking force is limited due to failure of the motor 120 or related parts.

The system 100 may calculate the engine friction braking force used to compensate for the limited regenerative braking force using the kick-down shifting at a current gear stage when the brake operates during driving of the vehicle so that the system may set the calculated braking force as the target regenerative braking force (step S102).

In more detail, the system 100 may compare a braking force in a gear stage used when the driver depresses the brake pedal during driving of the vehicle and the largest value among values corresponding to the braking force generated by the engine friction according to the drivable gear stage, and may set a smaller value among the compared values as the target regenerative braking force.

When the brake pedal is depressed, the braking force in the gear stage may be calculated according to the value of the BPS. For example, when the value of the BPS is 10%, the braking force in the gear stage may be −50 Nm. The engine friction braking force according to the driving gear stage may be −20 Nm or −40 Nm, and the largest engine friction braking force of the −20 Nm and the −40 Nm is −40 Nm. After −40 Nm is compared with −50 Nm, the target regenerative braking force may be set to a smaller value of −40 Nm.

In other words, when the regenerative braking force is limited in a regenerative braking interval of the vehicle, the limited regenerative braking force should be compensated for. Therefore, the engine friction braking force used to compensate for the limited regenerative braking force using the kick-down shifting may be calculated and may be used as the target regenerative braking force.

The system 100 may perform regenerative braking control using the target regenerative braking force (step S104) when a regenerative braking condition is satisfied in a state in which the brake operates during driving of the vehicle (step S103).

At this time, the system 100 may detect operation of the brake pedal conducted by the driver by detecting displacement of the brake pedal. The system 100 may check the SOC of the battery 140, the battery temperature, temperature of the motor 120, and temperature of an inverter that may be included in the motor controller 130, etc. to determine whether the SOC of the battery, the battery temperature, temperature of the motor, and temperature of the inverter are in a state in which regenerative braking can be performed. When the SOC of the battery, the battery temperature, temperature of the motor, and temperature of the inverter are in the state for performing regenerative braking, the system 100 may determine that the regenerative braking condition is satisfied.

However, when the SOC of the battery is in a fully charged state or at least one of the battery temperature, motor temperature, and the inverter temperature exceeds a set limit value, the system 100 may determine that the regenerative braking condition is not satisfied not to perform regenerative braking (step S103).

The system 100 may determine whether the regenerative braking force is limited during the regenerative braking control (step S105).

Regenerative braking regulations state that the limited regenerative braking force must be compensated for the limited regenerative braking force when the regenerative braking force is limited during braking of the vehicle.

Accordingly, the system 100 may determine whether the regenerative braking force is generated to determine that the regenerative braking force is limited when the regenerative braking force is not generated or the regenerative braking force is less than the target regenerative braking force (step S105).

At this time, the system 100 may diagnose why the regenerative braking force is not generated or reduced when the regenerative braking force is not generated or reduced according to a state of the battery, the motor, or the inverter. The system 100 may use the diagnosed cause to display diagnosis information on limitation of the regenerative braking force via a cluster or a display.

The system 100 may calculate the limited regenerative braking force as a difference between the target regenerative braking force and a regenerative braking force currently generated (step S106).

The system 100 may perform the kick-down shifting using the gear stage that corresponds to the engine friction braking force and compensates for the limited regenerative braking force (step S107).

Here, the system 100 may perform the kick-down shifting as the highest gear stage among the gear stages capable of generating the engine friction braking force greater than the limited regenerative braking force.

This is because the engine friction braking force used by the kick-down is larger than the regenerative braking force, but a difference in deceleration feeling may be minimized by using the engine friction braking force as close as possible to the limited regenerative braking force.

As described above, the exemplary embodiment of the present disclosure may satisfy the regenerative braking regulations without an additional hydraulic regenerative braking system by compensating for the braking force using kick-down shifting when the regenerative braking force of the mild hybrid vehicle is limited. Thus, fuel efficiency of 2% may be improved.

In addition, the exemplary embodiment may increase customer satisfaction of the mild hybrid vehicle and may reduce production cost of the vehicle by maintaining a regenerative braking function while omitting the hydraulic regenerative braking system.

The exemplary embodiments of the present disclosure have been described, but the scope of the present disclosure is not limited thereto and may be variously modified.

For example, although the mild hybrid vehicle has been described in the exemplary embodiments of the present disclosure, the present disclosure is not limited thereto, and the present disclosure is also applicable to a full type hybrid vehicle.

In other words, the hydraulic regenerative braking system applied to the full type hybrid vehicle is omitted, and the full type hybrid vehicle may use the system 100 to reduce production cost while satisfying the regenerative braking regulations.

The exemplary embodiment of the present disclosure is not implemented by the aforementioned apparatus and/or method, and may be implemented by a program for operating a function corresponding to the configuration of the exemplary embodiment of the present disclosure, a recording medium in which the program is recorded, and the like, and the implementation may be easily realized from the description of the aforementioned exemplary embodiment by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling regenerative braking in a hybrid vehicle, the system comprising:
    a driving information sensor detecting driving information according to driving of the hybrid vehicle;
    a motor assisting a driving force of an engine in an acceleration interval of the hybrid vehicle and operating as a generator in a deceleration interval in which a brake operates;
    a motor controller charging a battery using a regenerative energy generated by the motor;
    a hybrid controller calculating braking forces generated by friction in the engine according to respective drivable gear stages of the hybrid vehicle, comparing a braking force in a gear stage currently used when a driver of the hybrid vehicle depresses a brake pedal during driving of the hybrid vehicle with a largest value among the calculated braking forces, setting a smaller value of the braking force in the gear stage currently used and the largest value among the calculated braking forces as a target regenerative braking force to control regenerative braking, and controlling a kick-down shifting to shift to a gear stage corresponding to a braking force that compensates for a limited regenerative braking force, among the drivable gear stages; and a transmission controller performing the kick-down shifting based on control of the hybrid controller.

2. The system of claim 1, wherein the hybrid controller controls the kick-down shifting to shift to a highest gear stage among the drivable gear stages capable of generating a braking force that is greater than the limited regenerative braking force.

3. The system of claim 1, wherein the hybrid controller determines whether a regenerative braking force is generated when the regenerative braking is controlled to determine that the regenerative braking force is limited when the regenerative braking force is not generated or the regenerative braking force is less than the target regenerative braking force.

4. The system of claim 1, wherein the hybrid controller calculates the limited regenerative braking force as a difference between the target regenerative braking force and a currently generated regenerative braking force.

5. The system of claim 1, wherein the hybrid vehicle is a mild hybrid vehicle or a full type hybrid vehicle.

6. A method for controlling regenerative braking to compensate for a limited regenerative braking force when regenerative braking of a mild hybrid vehicle is limited, the method comprising:

a) calculating, by a hybrid controller, braking forces generated by an engine friction according to respective drivable gear stages of the mild hybrid vehicle;

b) comparing, by the hybrid controller, a braking force in a gear stage used when a driver of the mild hybrid vehicle depresses a brake pedal during driving of the mild hybrid vehicle and a largest value among the calculated braking forces, and setting, by the hybrid controller, a smaller value of the braking force in the gear stage currently used and the largest value among the calculated braking forces as a target regenerative braking force;

c) controlling, by the hybrid controller, regenerative braking using the target regenerative braking force when a regenerative braking condition is satisfied in a state in which the brake operates during driving of the mild hybrid vehicle; and d) controlling, by the hybrid controller, a kick-down shifting to shift to a gear stage corresponding to a braking force, which compensates for a limited regenerative braking force, among the drivable gear stages.

7. The method of claim 6, wherein step d) comprises controlling the kick-down shifting to shift to a highest gear stage among the drivable gear stages capable of generating a braking force greater than the limited regenerative braking force.

8. The method of claim 6, wherein step c) comprises determining that the regenerative braking condition is satisfied when the a state of charge (SOC) of a battery, a temperature of the battery, a temperature of a motor, and a temperature of an inverter are in a state for performing the regenerative braking when the brake operates during driving of the mild hybrid vehicle.

9. The method of claim 6, wherein step d) comprises calculating the limited regenerative braking force as a difference between the target regenerative braking force and a currently generated regenerative braking force.

10. The method of claim 6, wherein step d) comprises displaying diagnosis information on limitation of the regenerative braking force when the regenerative braking force is not generated or reduced according to a state of at least one of a battery, a motor, and an inverter.

* * * * *